Feb. 20, 1968  B. H. CISCEL  3,369,778
AUTOMATIC PILOTS

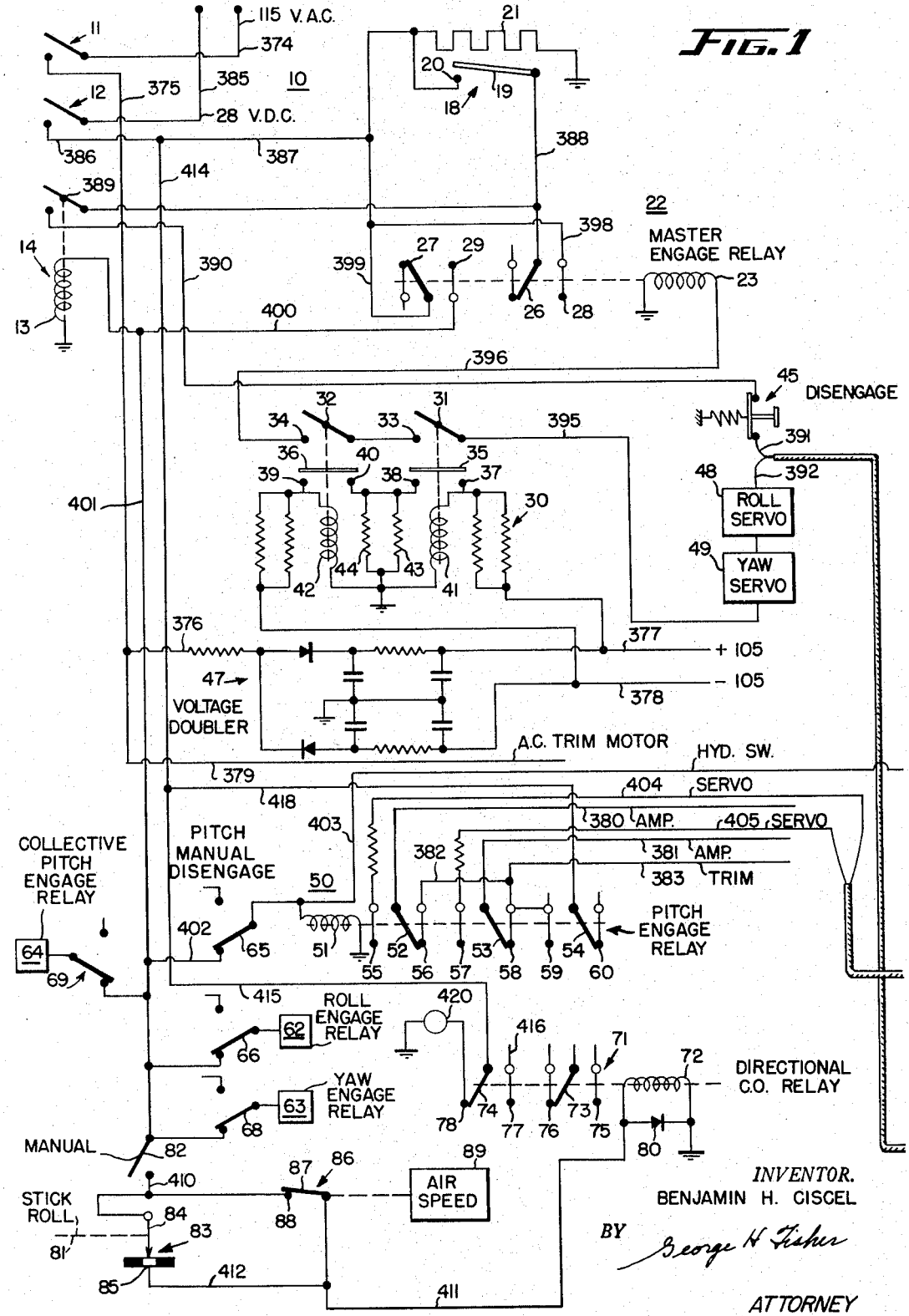

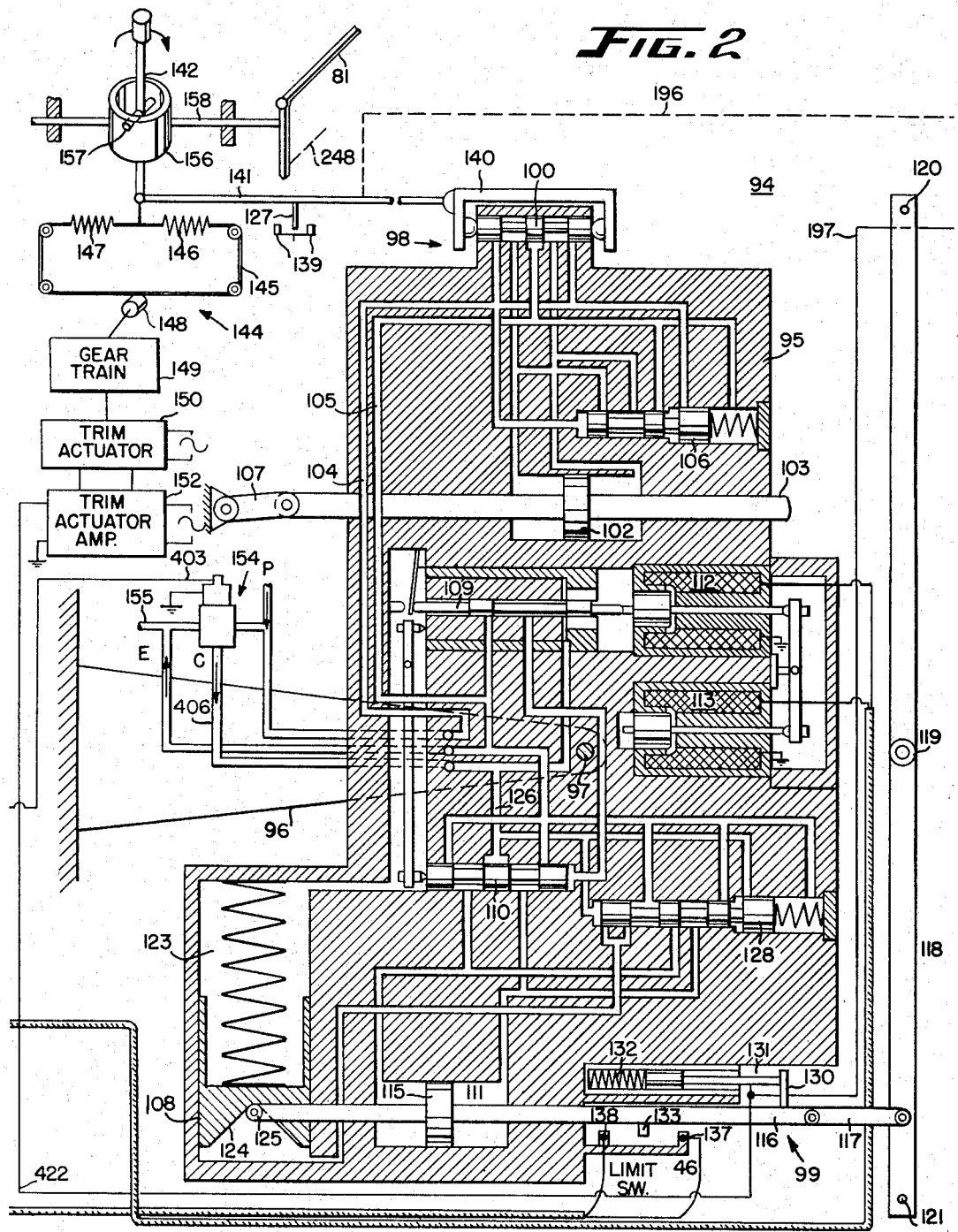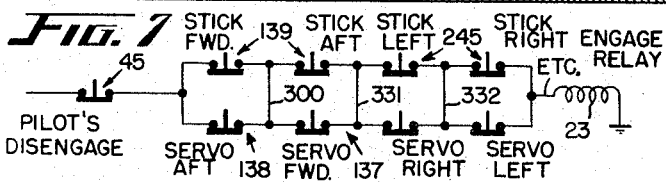

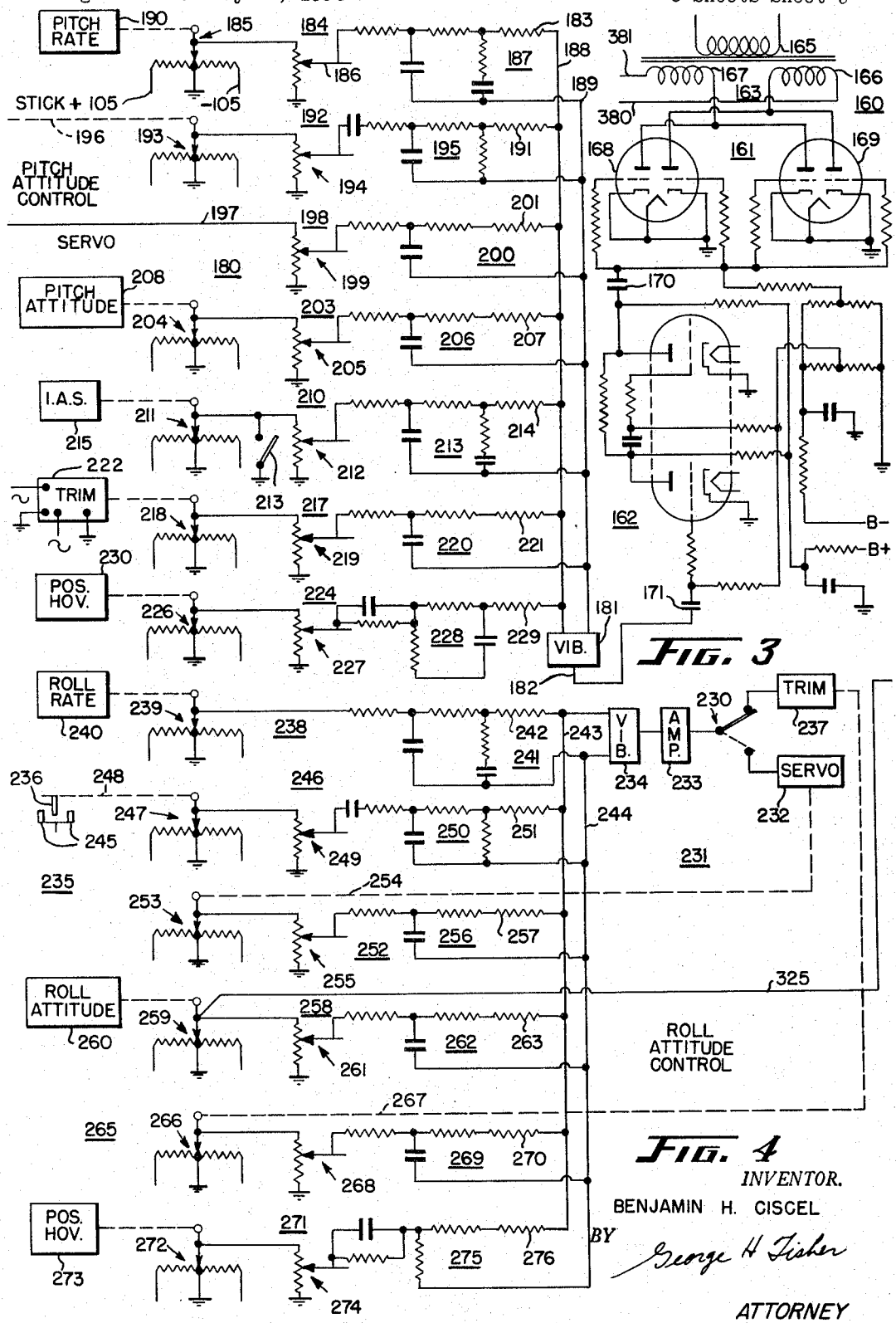

Original Filed May 24, 1954  5 Sheets-Sheet 4

INVENTOR.
BENJAMIN H. CISCEL
BY George H. Fisher
ATTORNEY

United States Patent Office 3,369,778
Patented Feb. 20, 1968

3,369,778
AUTOMATIC PILOTS
Benjamin H. Ciscel, 6505 Glenwood Ave.,
Minneapolis, Minn. 55427
Continuation of application Ser. No. 431,862, May 24,
1954. This application June 8, 1967, Ser. No. 645,568.
39 Claims. (Cl. 244—77)

ABSTRACT OF THE DISCLOSURE

A three axes stabilization system plus altitude control of a dirigible craft, such as a helicopter, uses a novel flight control system involving a fluid type, differential operated, actuator. The actuator has a manually controlled section and an automatic condition control section, for each of the axes of the craft. The manually operated section has greater authority over the actuator output member than does the automatic operated section.

Figure 5:
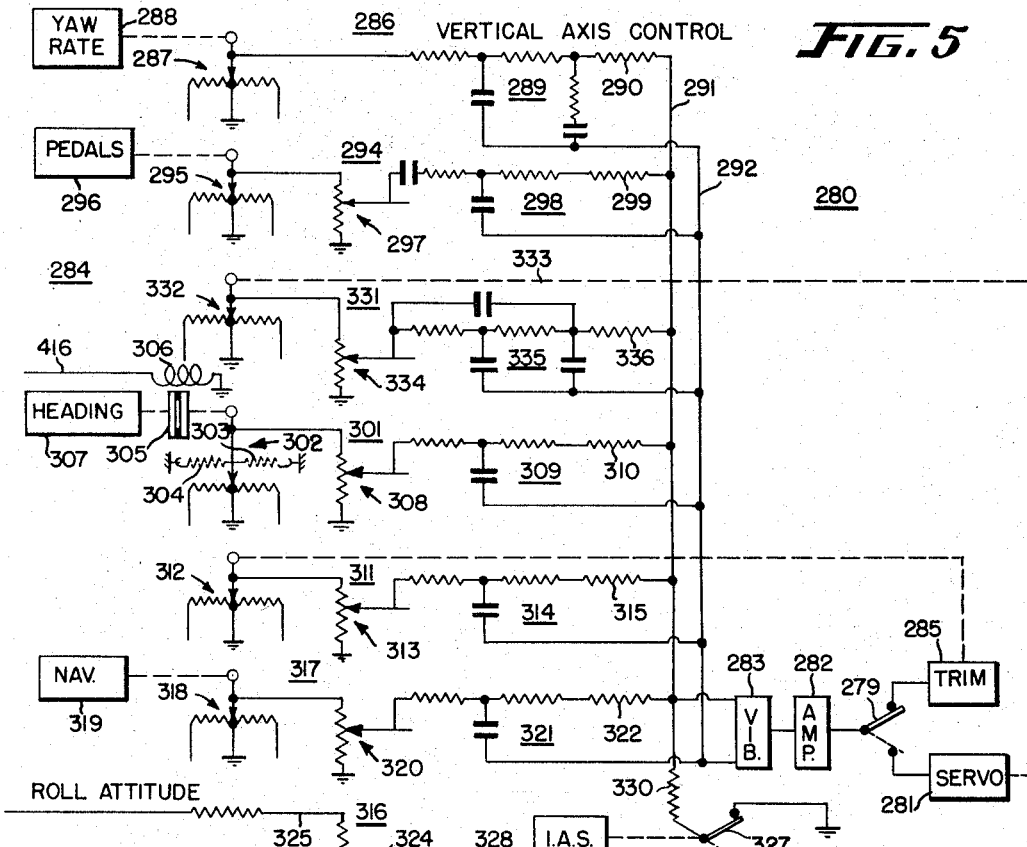

During long term departures of the automatic section from a normal or unoperated position a centering arrangement for the manual section is automatically repositioned to reposition the manual section causing return of the automatic section to unoperated position.

The manual section may be operated also to initiate forward flight of the helicopter and roll attitude change may also be effected, if roll attitude change occurs above a predetermined airspeed a banked turn automatically results.

The automatic section of the fluid actuator is of the piston-cylinder type reversibly controlled in accordance with the operation of a pilot valve. The valve is responsive to electrical control signals supplied by sensors. Included in the automatic section is a centering device for the piston and cylinder; and centring device is disabled upon energization of a solenoid operated, fluid transmitting valve. The electrical energy for the solenoid operated valve and for the electrical control signals is provided by a common supply or common source, whereby failure of the common electrical supply interrupting operation of the pilot valve also results in operation of the centering device, centering the piston and cylinder.

By reason of the differential arrangement, the manual control section may be operated to control the craft accompanied by the inclusion or exclusion of operation of the automatic section, selectively.

---

This is a continuation application of copending application Ser. No. 431,862, filed May 24, 1954, and now abandoned.

This invention relates to automatic flight control apparatus for dirigible craft and more particularly to control apparatus for a rotary wing aircraft. Said aircraft includes operative device for controlling the longitudinal, lateral, and yaw attitudes of the craft as well as the altitude level of the craft to effect navigation thereof.

It is an object of this invention to position the operative devices of a rotary wing aircraft from a novel manual and electro-fluid operated control arrangement.

It is a further object of this invention to provide a novel control arrangement having a combination of manual and electro-fluid operated portions wherein the manual portion is directly responsive to the conventional manual pilot operated levers of the craft and wherein the electro-fluid operated portion may be selectively included or excluded from the arrangement.

A further object of this invention is to provide a novel manual engagement control station for the electro-fluid operated portion to connect a controller thereof to the fluid pressure source.

It is a further object of this invention to provide in the electro-fluid portion novel sources of control signals for stabilizing craft attitude and changing craft attitude.

It is a further object of this invention to provide improved fail safe means for including or excluding the electro-fluid operated portion from the combination for positioning the operative devices of a helicopter.

A further object of this invention is to provide a differential combination of the manual and electro-fluid portions and wherein variations of possible extents of operations are assigned so that the extent of manual portion operation exceeds that of the electro-fluid portion and wherein the electro-fluid operated portion may be automatically restored to its unoperated position either when the electro-fluid portion is excluded or on occurrence of drop in fluid pressure to the fluid operated portion.

A further object of this invention is to cause the fluid operated portion in the above arrangement to be returned to unoperated position by modifying automatically the position of the manual portion during long term departures of the fluid operated portion from normal position but wherein no such modification occurs during short term or transient departures from the normal position.

It is a further object of this invention to maintain for use the maximum output of the fluid operated portion in a differential manual and automatic electro-fluid operated control apparatus during combined manual and automatic operation.

It is a further object of this invention to provide a differential servomotor having manually and autopilot operated portions for positioning the control devices of a rotary wing aircraft and in which the autopilot portion has a control valve operable from a tiltable lever which is positioned by two electrical windings energized from a full wave discriminator amplifier.

It is a further object of this invention to alternatively utilize said amplifier during the time the electro portion is disconnected to balance said electro portion.

A further object of this invention is to provide a novel compact fluid servomotor for operating the control devices of a rotary wing aircraft.

These and further objects of the invention will be made more evident on consideration of the following description taken in conjunction with the accompanying drawing disclosing a preferred embodiment thereof.

Figure 6:
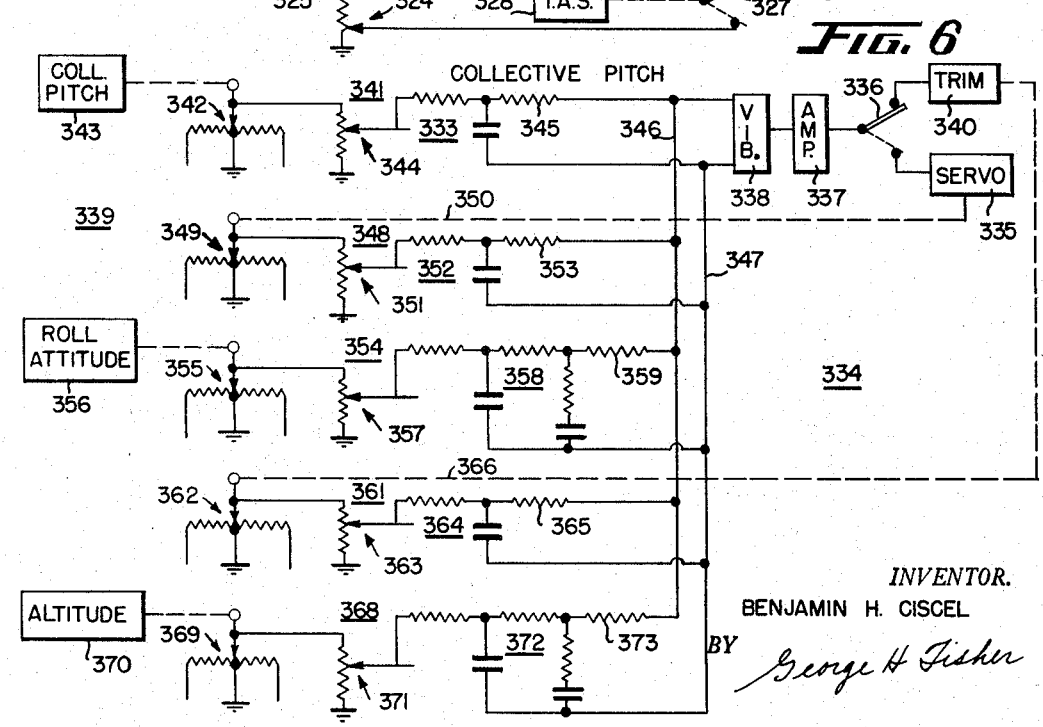
Figure 8:
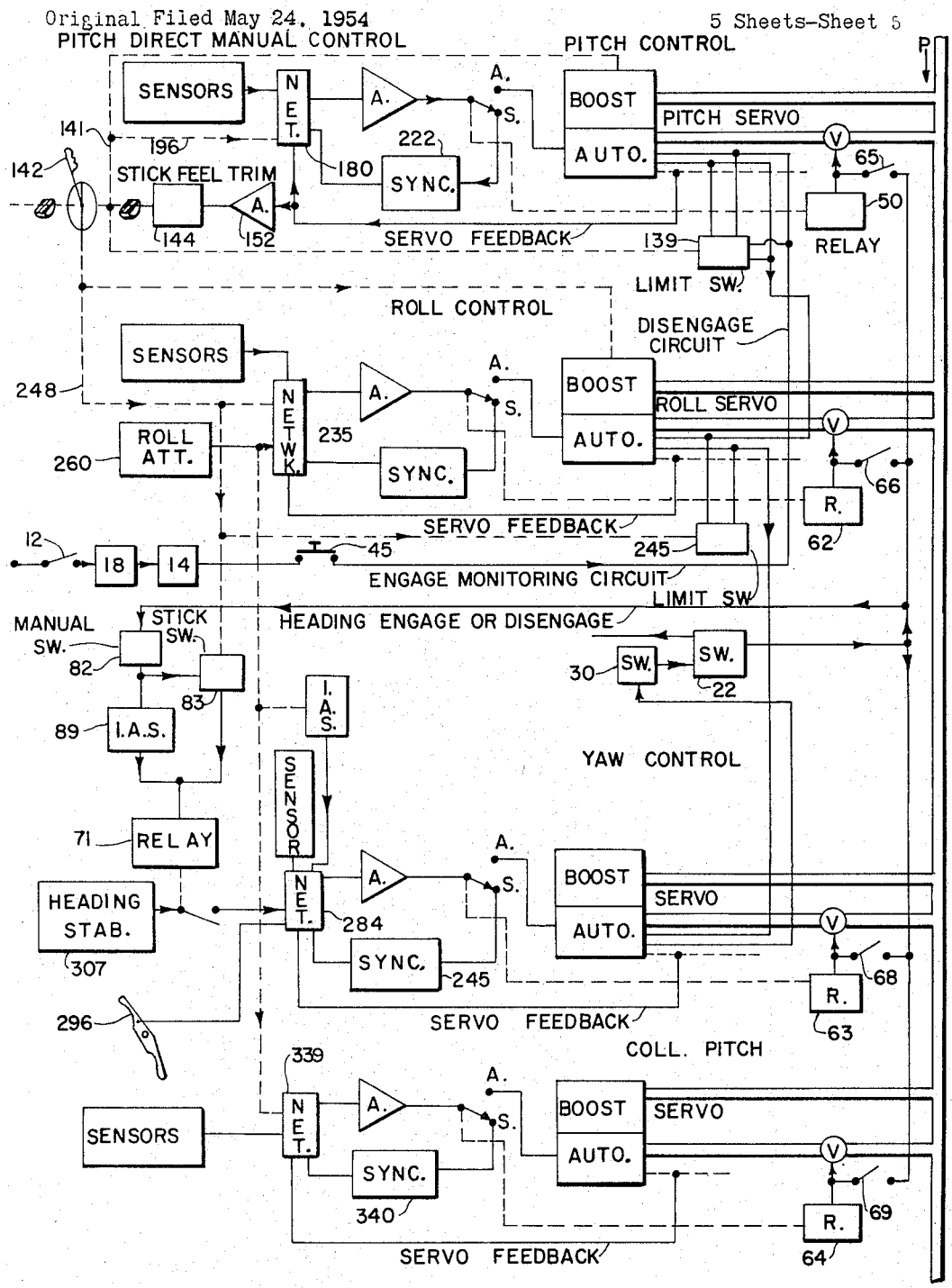

Referring to the drawing:

FIGURE 1 is a circuit schematic of a manual control autopilot engagement station, FIGURE 2 is a detail illustration of a servomotor utilized in the apparatus along with the manual operable controller, FIGURE 3 comprises an amplifier for controlling the type of servomotor of FIGURE 2 for controlling one channel of the automatic pilot along with a balanceable network for controlling the amplifier, FIGURE 4 is the lateral attitude control arrangement for the craft, FIGURE 5 is the yaw or vertical axis control for the craft, FIGURE 6 is the collective pitch channel of the automatic pilot for the rotary wing craft, FIGURE 7 illustrates a portion of an autopilot engage circuit associated with FIGURE 1; and FIGURE 8 represents a schematic diagram of the general over-all arrangement.

The automatic control apparatus for a rotary wing aircraft comprises four channels of control. One of these channels controls the longitudinal attitude of the craft; a second controls the lateral attitude of the craft; and a third controls the attitude of the craft about its yaw or vertical axis; and the fourth controls the flight level or altitude of the craft.

In the description of the apparatus, the channel for controlling the longitudinal attitude will be referred to in detail immediately below. A general description of each of the three remaining channels only will be included due to the similarity of the four channels.

Referring to FIGURE 2, a hydraulic fluid operated servomotor 94 operates a control member 120 or 121 of the rotary wing aircraft for controlling the longitudinal or pitch attitude thereof. The servomotor comprises a manual boost section 98 and an autopilot section 99 wherein operation of section 95 displaces an output member of section 99 but said output may also be moved relative to section 95. The boost section is controlled from a conventional pilot's control column 142 of the craft. The autopilot section of the servomotor includes a control valve which is controlled from an operable electronic amplifier, FIGURE 3. The operation of the amplifier is controlled by a balanceable control signal providing impedance network 180. The output control of the amplifier may be alternatively applied as shown in FIGURE 4 either to effect the operation of the autopilot section 232 of the servomotor or may be applied to a trim motor 237 for balancing the impedance network that controls the amplifier. The alternative connection of the amplifier to the servomotor or to the trim motor is controlled by the engagement station in FIGURE 1. The engagement station FIGURE 1 comprises manually operable power switches 11 and 12 for connecting respectively a source of 115 volts AC and 28 volts DC to amplifier and network control apparatus. The alternating voltage serves to energize various stabilizing apparatus of the craft and the direct current serves to energize various relays to be described. A third manually operable switch 389, which is solenoid held, through a master engage relay 22 serves to energize a plurality of autopilot channel engage relays. An autopilot pitch channel engage relay 50 on energization thereof switches the output of the amplifier 160, FIGURE 3, from a trim motor and applies it to control means of the autopilot section of the servomotor, 112 and 113, FIGURE 2.

The balanceable networks of the amplifiers are of the DC parallel summing type and are connected to an AC rectified source of voltage 47. Safety devices 30, have been provided so that upon a change in voltage either of the AC supply to the rectifier 47 or the DC output thereof, the engage relay will be deenergized and the amplifier will be disconnected from the autopilot section of the hydraulic fluid servomotor.

In FIGURE 1, an engagement station 10 as stated includes a single pole single throw switch 11 supplied with 115 volts AC, a normally open single pole single throw switch 12 supplied with 28 volts DC, and a manually operable-solenoid held normally open single pole single throw switch 389. While FIGURE 1 includes other features which may be located at the engagement station yet since they are electrically connected they may also be remotely positioned. FIGURE 1 includes a normally open thermally operated switch 18 comprising an operable arm 19 and a normally disengaged contact 20. The switch includes the thermal element 21 which on heating actuates the arm 19 into engagement with contact 20. FIGURE 1 additionally includes a master engage relay 22, a protective relay 30, a voltage doubler 47, a pitch attitude control channel engage relay 50, and a directional cut out relay 71. Relay 22 comprises an operating winding 23 for operating relay arms 26, 27 into engagement with their respective in contacts 28 and 29. Relay 30 comprises two sections, one section including a pivoted relay arm 31, the other a pivoted relay arm 32. Arms 31 and 32 engage their respective in contacts 33, 34. Arm 31 is provided with an operating winding 41, and arm 32 is provided with an operating winding 42. Winding 41 additionally operates a double make relay contact 35 which coacts with contacts 37, 38. Winding 42 additionally operates a double make contact 36 which engages contacts 39 and 40. In parallel with operating winding 41 on energization thereof is a resistor 43 and in parallel with winding 42 on operation thereof is a resistor 44. The purpose of the resistance 43 and 44 is to narrow the difference between the relay "pull-in" voltage and the relay "drop-out" voltage so that the autopilot is disengaged upon a slight drop in supply of voltage to the balanceable networks. The voltage doubler 47 may be of a conventional type utilizing either selenium rectifiers or conventional diodes in the arrangement. Relay 50 is of the three pole double throw type and includes an operating winding 51 for actuating pivoted arms 52, 53 and 54 from engagement with their respective out contacts 56, 58, 60 into engagement with their respective in contacts 55, 57, and 59. Connected in parallel with the pitch attitude engage relay 50 to the master engage relay 22 are the roll attitude engage relay 62, the yaw attitude engage relay 63, and the collective pitch engage relay 64. Relays 50, 62, 63 and 64 are provided respectively with single pole single throw normally closed manually operable disengage switches 65, 66, 68 and 69 to permit independent operation of the various axes. Directional cutout relay 71 functions to connect a heading sensing device with an impedance network or to disconnect it therefrom. Relay 71 is of the two pole double throw type comprising pivoted arms 73, 74 operated from engagement with respective out contacts 78, 76 into engagement with their respective in contacts 77, 75 by the operable winding 72 of the relay. The circuit through winding 72 is shunted by an arc preventing device 80 which may be a rectifier. The energizing circuit for operating winding 72 of relay 71 includes a single pole single throw manually operable switch 82 which is in series with a pair of parallel connected switches 83, 86. The switch 83 comprises a contactor 84 which in normal position engages a contact 85. The contactor 84 is operated from a conventional control column of the aircraft on operation thereof to change lateral attitude of the craft. The switch 86 comprises an operating arm 87 which is normally in engagement with the contact 88. The arm 87 is operated by an air speed responsive device 89 when the craft attains an air speed of approximately 40 knots. Thus when the craft has attained a speed of 40 knots, upon movement of the control column to vary lateral attitude of the craft the heading stabilizing device is rendered ineffective permitting banked turns. At speeds below 40 knots lateral stick motion results in sidewise motion of the craft with heading held constant.

The energization of the winding 23 of the master engage relay 22 in addition to being controlled by the relay arms 31, 32 of relay 30 is also controlled by a manually operable normally-closed momentarily-open disengage switch 45, and series connected servo limit switch arrangements 46 (FIGURE 2), 48 and 49 of the pitch, roll, and yaw control servomotors.

Leaving the engaging station of FIGURE 1 for the time being, the servomotor of FIGURE 2 will now be considered. The servomotor 94 is of the rotary hydraulic type and comprises a body member 95 supported on a frame member 96 by means of a suitable pivot connection 97. On opposite sides of the pivot connection is a manually controlled boost section 98 and an autopilot controlled section 99. The boost section comprises a manually operable valve 100 for controlling the supply of fluid from a source of hydraulic pressure to opposite sides of the power piston 102 carried by a piston rod 103. One end of the piston rod is fixed to the frame of the craft through a linkage 107. Thus upon operation of the manual control valve 100, and the application of pressure to one or the other sides of piston 102, the housing member 95 rotates about the pivot 97. Pressure to the control valve 100 is supplied through a conduit 104 while conduit 105 serves as a return to the source of pressure. A low pressure responsive device 106 comprising a spring biased plunger valve connects opposite sides of piston 102 to permit manual operation of the body member 95 when fluid pressure is absent. Upon application of pressure of a predetermined value, however, the device 106 is moved to the right in the figure to interrupt the connection between the opposed sides of piston 102 thus permitting normal piston operation. As shown in the figure, the device 106 has been partly operated from its extreme left position such that normal operation may be effected. The autopilot section 99 comprises a pilot valve 109, a control valve 110 responsive thereto, and a power section 111 responsive to the operation of the control valve 110. The position of the pilot valve 109 is controlled by a pair of solenoid windings 112, 113 which may be alternatively energized from an autopilot amplifier. The pilot valve 109 in turn through hydraulic pressure serves to position the control valve 110. The power section 111 includes a power piston 115 supported on a piston rod 116. The piston rod 116 is connected to a pivoted member 118 through a link 117. The member 118 for the purpose of clearness has been shown as mounted on a separate pivot 119. However, in actual practice, the member 118 may be mounted on the same axis as pivot 97 of the body member 95. The opposite ends of member 118 are provided with suitable connections which may be alternatively used to adjust control devices on the rotary wing aircraft to alter its attitude or to provide a similar function. A mechanical centering arrangement 123 is provided to center the piston 115 upon loss of hydraulic pressure. The centering arrangement comprises a spring biased plunger 108 having a suitable contour 124 provided which engages a portion 125 on the opposite end of the piston rod 116. The source of pressure is supplied to the autopilot section 99 through a conduit 126. Upon movement to the right of a by pass valve 128 in response to pressure in conduit 126, pressure is supplied to the lower side of the contoured plunger 108 as shown in the figure which causes the compression of the biasing spring and the disengagement of the contour portion 124 from the portion 125 of the autopilot piston. Since the provisions of the valves for controlling the automatic pilot section 99 of the motor 94 are shown and described more in detail in a copending application of Paul Hayner filed on even date herewith and since the specific valving formed no part of the present invention only a general discussion of their operation is given. The piston rod 116 carries an operating member 130 for a potentiometer slider 131 of a follow-up potentiometer having the resistor 132. The relative displacement of the sliders 131 and 132 varies with the relative displacement of the autopilot sectoin 99. Thus the slider 131 is moved relative to housing member 95 in accordance with the relative displacement of piston 115 and the housing member. The piston rod 116 additionally includes an operating member 133. The member 133 operates limit switches 137 or 138 when the piston 115 has moved to either extreme position. The limit switches may be single pole single throw switches which are connected to form an arrangement 46 and are further connected with the switches 48, 49 of FIGURE 1 in an arrangement more clearly apparent in FIGURE 7. The valve 100 in the manually controlled boost section 98 has its opposite ends engaged by a yoke member 140. The yoke member is connected to an operating rod 141 connected to the conventional control column 142 of the aircraft. The control column 142 is supported in a suitable arrangement 156 so that in addition to being rotatable about a lateral axis 157 parallel to the pitch axis of the craft it is also rotatable about an axis 158 parallel to the longitudinal axis of the craft. Upon fore and aft movement of the control column 142, the control valve 100 is displaced in one or the other directions to effect rotation of the rotary servomotor 94 in one or the other directions. A biasing or pilot feel arrangement 144 is connected to the control column 142. The biasing arrangement comprises a loop 145 supported on suitable guide pulleys and including biasing means in the form of springs 146, 147. The loop 145 is held against movement during operation of the control column 142 by a member 148 connected thereto. The member 148 is connected to a gear train 149 which is operated by a trim actuator 150. The trim actuator in turn is controlled from a conventional AC discriminator amplifier 152 which derives its control signal from the follow-up potentiometer 132 of the servomotor 94. Upon steady state displacement of slider 131 relative to resistor 132, the trim actuator 150 serves to alter the free position of the control column 142.

The ultimate effect of the trim actuator is to thereby effect operation of the rotary servomotor 94 to effect centering of the piston 115 of the autopilot section 99 of the servomotor.

Whereas the application of fluid pressure is supplied directly from the source of pressure to conduit 104, the supply of pressure to the conduit 126 in the autopilot section of the servomotor is controlled by a solenoid operated valve 154. Upon energization of the valve, fluid pressure is supplied to conduit 126 whereas upon deenergization of the valve 154 conduit 126 is placed in communication with exhaust conduit 55 leading to the reservoir.

The energization of solenoid windings 112, 113 of the servomotor 94 is provided by one section, shown in FIGURE 3 of a multiple channel automatic pilot amplifier. Since all sections of the amplifier are similar, the description of but one section will be made. The amplifier section for the pitch attitude channel, FIGURE 3, is an AC discriminator amplifier having an AC discriminator section 161 and a voltage amplification section 162 preceding it. A source of alternating voltage is supplied by a transformer 163. The transformer comprises a primary winding 165 and a pair of secondary windings 166, 167. Associated with the two secondary windings are one or more double triode tubes 168 and 169, each having a pair of plate elements, a pair of grid elements, and a pair of cathode elements. One end of secondary winding 166 is connected to one plate element, the opposite end of secondary winding 167 is connected to the other plate element of the two tubes. The remaining ends of secondary windings 166, 167 are connected to the operating solenoids 112, 113, FIGURE 2, of the hydraulic servomotor 94 via wires 381 and 380. The two grid elements are connected together and are connected through a capacitive coupling 170 to the voltage amplifier section 162. A second double triode 169 has its two plate elements connected in parallel with the plate elements of tube 168 and its grid elements are connected together to the grid elements of tube 168. Input control signals are supplied through a coupling condenser 171 to the voltage amplifier 162 with the control signal having the same frequency as the alternating voltage supplied to primary winding 165. Thus half wave discrimination of the input signal to coupling condenser 171 is provided by the discriminator section 161. Control signals affecting craft pitch attitude are derived from a balanceable DC bridge network 180 and converted to alternating voltages by vibrator 181 are supplied through the output conductor 182 to the coupling condenser 171. The network 180 comprises a craft pitch rate network 184; a control column network 192; a servomotor follow-up network 198; a pitch attitude network 203; an indicated air speed network 210; a network synchronizing or trim network 217; and a longitudinal position hovering network 224. Network 184 comprises a pitch rate signal generator in the form of a center tapped potentiometer 185 having its ends connected to the plus 105 and minus 105 voltage supply terminals of voltage doubler 47, FIGURE 1. A voltage dividing potentiometer or sensitivity adjustment 186 is connected across a slider and center tap of potentiometer 185. A lag network 187 is connected to an adjustable tap of the voltage dividing potentiometer 186 and the output side of the lag network is connected through a summing resistor 183 to a conductor 188 with the remaining side of network 187 being connected to a ground conductor 189. The slider of potentiometer 185 is positioned with respect to the potentiometer resistor in accordance with the rate of pitch change of the craft by an angular pitch rate sensing device 190. The pitch rate sensing device 190 may be a conventional angular rate sensing device conventional in automatic pilots. Network 192 includes a signal generator 193 comprising a potentiometer having a grounded center tapped resistor whose opposite ends are connected to the output sides of the voltage doubler 47. A slider of the potentiometer is positioned in accordance with the fore and aft positions of the control column 142, FIGURE 2, the operation being effected by suitable mechanical connection 196 between the potentiometer slider and control column. The output of the potentiometer 193 is supplied across a voltage dividing potentiometer 194 having an adjustable tap connected to a rate network 195. One side of the network 195 is connected through a summing resistor 191 to conductor 188, the other side of network 195 being connected to the ground conductor 189. Network 198 comprises a servo follow-up potentiometer comprising slider 131 and resistor 132, FIGURE 2. The slider 131 as stated is positioned relative to resistor 132 in accordance with the relative displacement of power piston 115 and the servo casing 95. The slider 131 is connected to a voltage dividing potentiometer 199 and an adjustable tap thereof is connected through a coupling network 200 and a summing resistor 201 to conductors 188, 189. Network 203 comprises a pitch attitude signal generator consisting of a potentiometer 204 having a center tapped resistor with its ends connected to the output terminals of the voltage doubler 47. A slider of the potentiometer is positioned relative to the center tap in accordance with the pitch attitude of the craft about its lateral axis by a pitch attitude sensing device 208. The pitch attitude sensing device may be a conventional vertical gyroscope 208. A voltage dividing potentiometer or sensitivity adjustment 205 is connected across the signal generator 204 and an adjustable tap of the voltage dividing potentiometer is connected through a resistance network 206 and summing resistor 207 to the conductors 188, 189. Network 210 comprises an indicated air speed signal generator 211 comprising a potentiometer having a grounded center tapped resistor and an adjustable slider positioned in accordance with the indicated air speed of the craft by a suitable sensing device 215. A voltage dividing potentiometer 212 is connected across the potentiometer slider and grounded center tap of signal generator 211. A single pole single throw switch 213 is connected intermediate the signal generator 211 and voltage divider 212 and on operation thereof serves to bypass the voltage dividing potentiometer 212. The output of the voltage dividing potentiometer 212 is connected through a lag network 213 and a summing resistor 214 to conductors 188, 189. Network 217 includes a synchronizing signal generator 218 comprising a center tapped potentiometer having its slider displaced relative to the center tap by a trim or synchronizing motor 222. The motor 222 is energized from amplifier 160 through the out contacts 56, 58 of the pitch engage relay 50, FIGURE 1, and serves to balance network 180 during the disconnection of the amplifier 160 from the relay in contacts and thus from the hydraulic servo section 99. A voltage dividing potentiometer 219 is connected across the signal generator 218 and an adjustable tap of the voltage divider 219 is connected through a resistance network 220 and summing resistor 221 to conductors 188, 189. The impedance network 224 comprises a voltage signal generator 226 comprising a potentiometer having a grounded center tapped resistor whose ends are connected to the output terminals of the voltage doubler 47, which as stated is also the case of resistors of potentiometers 185, 193, 204, 211, 218. The potentiometer includes a slider which is positioned relative to the center tap by position hovering device 230 responsive to the displacement of the craft in a fore and aft direction from a point in a vertical line above a position, for example, on the surface of the earth. The hovering position sensing device 230 may be similar to that disclosed in a copending application of Clarence E. Vogel and Alden J. Mooers now Patent 2,873,075. The signal from generator 226 is applied to a voltage dividing potentiometer 227 which in turn is connected through a rate network 228 and summing resistor 229 to conductors 188, 189. The conductors 188, 189 supply the DC control signals to a DC to AC converter 181. The converter may be a conventional vibrator having an operating winding connected to the source of alternating voltage energizing primary winding 165 of the transformer 163 for the amplifier 160. The output conductor 182 as stated of the vibrator is connected to the amplifier coupling condenser 171.

The lateral or roll attitude of the craft is controlled by channel 231 in FIGURE 4, comprising a servomotor 232 which alters the direction of the rotor lift vector in a vertical plane through the lateral axis of the craft. The servomotor is controlled through an operated relay arm 230 from an amplifier section 233 of the autopilot amplifier. The amplifier 233 is controlled through a vibrator or DC to AC converter 234 from a balanceable control signal network 235. The network 235 is similar in summing method to the network 180 for the longitudinal or pitch attitude control of the craft and comprises a craft roll rate network 238, a control column lateral position operated network 246, a servomotor network 252, a craft roll attitude network 258, a synchronizing network 265, and a craft lateral position hovering network 271. Network 238 comprises a craft roll rate voltage signal generator 239 having a potentiometer having a grounded center tapped resistor and slider positioned relative to the resistor center tap by a craft roll rate sensing device 240. The roll rate sensing device may be conventional angular rate sensing gyroscope. The potentiometer slider is connected through a lag network 241 and suming resistor 242 to network output conductors 243, 244. The conductors 243 and 244 are connected to the converter 234 which is similar to the vibrator 181 for the longitudinal attitude control channel. Network 246 includes a voltage signal generator 247 comprising a potentiometer having a grounded center tapped resistor and slider which is displaced relative to the center tap by an operating means 248 in accordance with the operation of the control column 142 from a normal position in a plane transverse to the craft's longitudinal axis. The output of the generator 247 is supplied to a voltage dividing potentiometer 249 having an adjustable tap which is connected through a rate network 250 and summing resistor 251 to conductors 243, 244. Network 252 includes a follow-up signal generator 253 comprising a potentiometer having a grounded center tapped resistor and a slider operated in a direction relative to the center tap by a suitable operating means 254 extending from the servomotor 232. The output of the potentiometer is supplied to a voltage dividing potentiometer 255 having an adjustable tap which is connected through a network 256 and summing resistor 257 to conductors 243, 244. Network 258 includes a voltage signal generator 259 comprising a potentiometer having a grounded center tapped resistor and slider displaced relative to the center tap from a roll attitude sensing device 260. The roll attitude sensing device may be a conventional vertical gyroscope. The output of the potentiometer is supplied to a voltage dividing potentiometer 261 having an adjustable tap which is connected through a network 262 and summing resistor 263 to conductors 243, 244. Network 265 includes a synchronizing signal generator 266 comprising a potentiometer having a grounded center tapped resistor and a slider positioned relative to the center tap from an operating connection 267 extending from the synchronizing or trim motor 237. The output of signal generator 266 is supplied to a voltage dividing potentiometer 268 having an adjustable tap which is connected through a network 269 and summing resistor 270 to conductors 243 and 244. Network 271 comprises a signal generator 272 having a potentiometer with a center tapped resistor and a slider positioned relative thereto by a position hovering device 273. The device 273 senses the departure of the craft in a transverse plane from a position in a vertical line above a point for example on the earth's surface. The device 273 may be similar to that disclosed in the aforesaid Vogel and Mooers application. The output of the voltage generator 272 is supplied to a voltage dividing potentiometer 274 having an adjustable tap which is connected through a rate network 275 and summing resistor 276 to conductors 243, 244. The ends of the potentiometers in signal generators 239, 247, 253, 259, 266 and 272 are connected across the output terminals of the voltage doubler 47, FIGURE 1.

Control of the craft about its vertical or yaw axis is obtained from an automatic pilot channel 280, FIGURE 5, having a servomotor 281 which operates control elements of the craft to vary its angular position about the vertical axis. The servomotor 281 is connected through the in position of a relay arm 279 to a discriminator amplifier 282 similar to amplifier 160. The amplifier 282 is connected through a DC to AC converter 283 to a balanceable impedance network 284 which derives control signals for the amplifier 282. Network 284 comprises a yaw rate network 286, a pedal operated craft control network 294, a heading stabilizing network 301, a synchronizing network 311, a craft flight path network 317, a turn control network 316, and a servo balance network 331. Network 286 includes a yaw rate signal generator 287 comprising a potentiometer having a grounded center tapped resistor and a slider displaceable with respect thereto by a yaw rate responsive device 288 which may be an angular rate gyroscope. The signal generator 287 is connected through a lag network 289 and summing resistor 290 to conductors 291, 292. The conductors 291, 292 constitute the output elements of the network 284 and are connected to the converter 283. Network 294 comprises a pedal position signal generator 295 having a potentiometer with a center tapped resistor and a slider displaceable with respect to the center tap by the control pedals 296 of the craft. A voltage dividing potentiometer 297 is connected across the grounded center tap and the slider. The voltage divider includes an adjustalbe tap which is connected through a network 298 and summing resistor 299 to conductors 291, 292. Network 301 includes a heading stabilizing voltage signal generator 302 comprising a potentiometer having a grounded center tapped resistor and an adjustable slider. A pair of centering springs 303, 304 bias the slider to the center tap of the resistor. The slider is moved relative to the center tap through a magnetic clutch 305 from a heading responsive device 307. The heading responsive device 307 may be of the type conventional in the art which is responsive to change in heading of the craft. The clutch 305 includes an energizing winding 306. The arrangement is such that upon deenergization of winding 306, the centering springs 303, 304 return the slider to the center tap of the resistor. A voltage dividing poteniometer 308 is connected across the slider and center tap of the resistor. The voltage divider 308 includes an adjustable tap which is connected through a network 309 and summing resistor 310 to conductors 291, 292. Network 311 includes a synchronizing signal generator 312 comprising a potentiometer having a resistor with a grounded center tap and a slider adjustable relative thereto by a trim or synchronizing motor 285. A voltage dividing potentiometer 313 is connected across the signal generator 312 and includes an adjustable tap which is connected through a network 314 and summing resistor 315 to conductors 291, 292. Network 317 includes a signal generator 318 comprising a potentiometer having a grounded center tapped resistor and an adjustable slider which is positioned relative to the center tap by a navigation control device 319. The device 319 effects operation of the potentiometer slider in accordance with radio beam on navigation computer outputs. A voltage dividing potentiometer 320 is connected between the slider and center tap. It includes an adjustable tap which is connected through a network 321 and summing resistor 322 to conductors 291, 292. The turn control network 316 comprises a roll attitude signal generator 259, FIGURE 4, and a voltage dividing potentiometer 324 connected across the signal generator. The voltage dividing potentiometer includes an adjustable tap which is connected through a single pole double throw switch 327 and summing resistor 330 to conductors 291, 292. The switch 327 is operated from the position shown in FIGURE 5 to its operated position by indicated airspeed device 328. Airspeed device 328 is similar to airspeed device 89, FIGURE 1, and could be the same device and functions when the craft has reached the predetermined airspeed to move the switch arm 327 to its operated position.

Control of the craft in a vertical direction so as to control its altitude is provided by a collective pitch channel 334 of the automatic pilot. The channel 334 includes a servomotor 335, FIGURE 6, for operating the altitude control devices of the craft. The servomotor is controlled through an operated relay arm 336 from a discriminator amplifier 337 similar to the amplifier 160. Control signals for the amplifier 337 are derived through a converter 338 from a balanceable network 339. Network 339 comprises a manual collective pitch network 341, a servo follow-up network 348, a vertical gyro collective pitch network 354, a synchronizing network 361, and an automatic altitude control network 368. Network 341 includes a manually operable signal generator 342 comprising a potentiometer having a center tapped resistor and a slider displaceable relative thereto from a manually operable collective pitch change means 343 on the craft. A voltage dividing potentimeter is connected across the slider and center tap and has an adjustable tap which is connected through a network 333 and summing resistor 345 to conductors 346, 347. The conductors 346 and 347 constitute the output elements of the network 339 and are connected to the converter 338. Network 348 includes a servomotor position signal generator 349 comprising a potentiometer having a grounded center tapped resistor and adjustable slider movable relative to the center tap by an operating connection 350 extending from the servomotor 335. A voltage dividing potentiometer 351 is connected across the center tap and slider. The voltage divider includes an adjustable tap which is connected through a network 352 and summing resistor 353 to conductors 346, 347. Network 354 includes a roll attitude compensating signal generator 355 for opposing loss of craft altitude in a banked turn comprising a potentiometer having a grounded center tapped resistor and an adjustable slider displaced relative thereto by a craft roll attitude responsive device 356. A voltage dividing potentiometer is connected between the center tap and slider and includes an adjustable tap which is connected through a lag network 358 and summing resistor 359 to conductors 346, 347. Network 361 includes a synchronizing signal generator 362 comprising a potentiometer having a center tapped resistor and a slider adjustable relative thereto by an operating connection 366 extending from a trim or synchronizing motor 340. A voltage dividing poteniometer 363 is connected across the slider and center tap and it includes an adjustable tap which is connected through a network 364 and summing resistor 365 to conductors 346, 347. Network 368 includes an altitude stabilizing signal generator 369 comprising a potentiometer having a center tapped resistor and adjustable slider movable relative thereto by an altitude responsive device 370. The altitude responsive device 370 may be of the conventional type and adjust the slider relative to the center tap in accordance with the change in altitude of the craft from a selected altitude. A voltage dividing potentiometer 371 is connected between the slider and resistor center tap. It includes a manually adjustable tap which is connected through a leg network 372 and summing resistor 373 to conductors 346, 347.

FIGURE 7 shows in greater detail the electrical relationship between the autopilot servomotor operated limited switches and the limit switches operable during movement of the control column 142 in the fore and aft direction and in the lateral direction. In FIGURE 7, the two limit switches 139, 139 which are operated by movement of the control column alternatively to its maximum forward position or its maximum rearward position are connected in series relation and in series with limit switches 245, 245 operated alternatively upon maximum displacement of the control column laterally to the left or to the right. These four switches are connected in parallel to the limit switches 138, 137 operated by the roll attitude control servometer and the similar limit switches operated by the autopilot pitch attitude servomotor on its operation to its extreme positions. The parallel arrangement of the control column and autopilot servomotor limit switches is connected in series with the pilot's disengage switch 45 and the engage relay 23. Cross connections 300, 331, 332 are provided extending from one set of series connected limit switches to the opposite set of series connected limit switches. The connections are such that when the control column for example is in its maximum forward position to operate one of its limit switches 139 and at the same time the autopilot end of the servomotor has moved aft a distance sufficient to operate its limit switch 138 the control circuit for energizing the engage relay 23 will be opened and the autopilot will be disengaged from the operating mechanism for the sustaining rotor. Thus this connection of the limit switches is such that such operation of the limit switches will disengage the autopilot from controlling the helicopter rotor whenever the human pilot and the automatic pilot are widely opposed. Thus if the autopilot is attempting to change attitude of the craft in one direction and the human pilot attempts to override such autopilot correction by moving the control column in the opposite direction and if the autopilot and the human pilot reach opposite extremes of positions, the autopilot will disengage to permit manual operation of the rotor pitch changing mechanism.

*Operation*

Manual operation of the boost end 98 of the pitch attitude control servomotor 94, FIGURE 2, as well as the three other hydraulic servomotors may be effected as soon as hydraulic pressure from the fluid source is available. Fore and aft operation of the control column 142 can be utilized to displace the boost control valve 100. Similarly, operation of the control column in a transverse plane of the craft will effect operation of the boost section control valve of the servomotor 232. Operation of the pedals 296 will also displace the control valve of the boost section of servomotor 281, FIGURE 5, to control the craft about the vertical axis. Also operation of the conventional collective pitch control device 343, FIGURE 6, will control the positioning of the valve in the boost section of the collective pitch control servomotor 335, FIGURE 6.

To introduce automatic control, the switches 11 and 12, FIGURE 1, are moved from their open position shown to their closed positions. With switch 11 closed, AC voltage is supplied over conductor 374, switch 11, conductor 375, conductor 376, to the voltage doubler 47. The output terminals 377, 378 respectively supply plus 105 and minus 105 volts DC to the control signal generators in networks 180, 235, 284 and 339. At the same time the voltage across terminals 377 and 378 energizes the windings 41 and 42 of the relay 30 thereby moving the relay arms 31 and 32 to their operated positions. Alternating voltage is also supplied from energized conductor 375, conductor 379, to the line winding of the synchronizing or trim motor 222, FIGURE 3. The motor 222 may be a capacitive type induction motor and the other winding thereof may be energized on unbalance of the amplifier control network 180 with the consequent operation of the amplifier 160 as follows. Depending upon the direction of unbalance of network 180, one or the other of the output conductors 381 or 380 of amplifier 160 is energized. Conductor 380 is connected through the relay arm 52, out contact 56, conductor 382, conductor 383 to the other winding of the trim motor. Similarly the amplifier conductor 381 is connected through the unoperated relay arms 53, out contact 58, to conductor 383 and thus to the other winding of the trim motor 222. The trim motor 222 operates in one or the other direction depending upon which amplifier conductor 381, 380 is energized. The motor operates the signal generator 218 to balance the control network 180 at which time no control signal is applied to the pitch channel amplifier 160.

In a similar manner, the control channels 231, 280, and 334 have their respective synchronizing or trim motors operated to balance the control networks for their respective amplifiers.

Following the closure of switch 12 also broadly shown in FIGURE 8, the thermal element 21 of switch 18 is energized and following a short time interval, the switch arm 19 through thermal action is brought into engagement with contact 20. Upon such engagement, a circuit is completed from energized conductor 387, contact 20, arm 19, conductor 388, operated switch 389, conductor 390, through disengage switch 45, conductor 391, the arrangement as in FIGURE 7 more broadly shown in FIGURE 8 comprising the roll attitude servo limit switches 137, 138, as well as similar limit switches of the pitch attitude servomotor and the control column limit switches 139, 139 and 245, 245 thence through the yaw attitude servomotor limit switches, FIGURE 1, conductor 395, relay arm 31, relay contact 33, relay arm 32, contact 34, conductor 396, master engage relay winding 23, to ground. With the energization of the master engage relay 22, a circuit is completed from energized conductor 338, relay arm 26, relay contact 28, conductor 398, conductor 399, relay arm 27, relay contact 29, conductor 400, through operating winding 13 for switch 389, maintaining the same in the closed position. A circuit is also completed from energized conductor 400, conductor 401, conductor 402, manually operable switch 65, relay winding 51 of the pitch engage relay 50, to ground. With the operation of the pitch engage relay 50, the output of the amplifier 160 over conductors 380, 381 is respectively supplied to relay arm 52, contact 55, conductor 404, to solenoid winding 112 of the autopilot section 99 of the servomotor 94, FIGURE 2. Also the output from the amplifier supplied to conductor 381 is supplied via operated relay arm 53, contact 57, conductor 405, to solenoid 113 of the servomotor, FIGURE 2. Operated in parallel with the pitch engage relay winding 51 from manually operable switch 65 via conductor 403 is the solenoid valve 154, FIGURE 2, for permitting the transfer of pressure to the inlet conduit 406 to the autopilot section 99 of the hydraulic servomotor 94. In a similar manner, the roll engage relay 62, the yaw engage relay 63, and the collective pitch engage relay 64 are operated in parallel with relay 50 to couple the respective control solenoids for the autopilot section of the individual hydraulic servomotors to their amplifiers and to operate similar solenoid valves similar to valve 154.

A directional cutout relay 71 is also energized from energized conductor 401, manually operable switch 82, conductor 410, parallel circuits comprising air speed operated switch 86 to conductor 411 or through the control column operated contactor 84 and contacts 85 and conductor 412 to conductor 411 through relay winding 72, to ground. With the operation of relay 71 a clutch energizing circuit is completed from energized conductor 387, conductor 414, conductor 415, relay arm 74, relay contact 77, conductor 416, magnetic clutch 306, FIGURE 5, to ground whereby the heading responsive device 307 is coupled to the heading stabilizing signal generator 302.

A braking circuit for the synchronizing motor is also provided simultaneously with the energization of relay 50 from energized conductor 414, conductor 418, relay arm 54, relay contact 59, conductor 383, to the second motor winding of trim motor 222 effecting a braking operation thereof.

After the engagement of the amplifier sections 160, 233, 282, and 337 to their respective hydraulic servomotors and their disconnection from their trim or synchronizing motors as shown in FIGURE 8, any unbalance of the amplifier networks effects operation of the respective amplifiers and their servomotors. Thus in the pitch attitude control, changes in the pitch attitude of the aircraft are sensed by the pitch attitude responsive device 208 which operates the slider of the signal generator 204 to effect an unbalance of the amplifier control network 180. The servomotor amplifier operates in response to such unbalance and positions through one or the other of the solenoid windings 112, 113 the pilot valve 109 of the servomotor 94. The operation of the pilot valve effects positioning of the control valve 110 and the subsequent operation of the piston 115. Upon the application of pressure to conduit 406 previously described, the low pressure valve 128, FIGURE 2, has been moved to the right and pressure had been applied to the lower contoured section 124 causing it to be moved in an upward direction, FIGURE 2, thus withdrawing the portion 125 from engagement with the contoured portion 124. Thus upon application of pressure to the piston 115 operation of the control elements of the craft to change its pitch attitude is effected. With the operation of the piston 115 the slider 131 of the follow-up potentiometer is also adjusted. This operation of the follow-up slider 131 effects a rebalance of the control network 180 for amplifier 160 and terminates its operation. Upon any subsequent unbalance of the control circuit 180 such as would result from restoring of the craft to its original position, the control network is again unbalanced in the opposite direction, since the follow-up signal exceeds the pitch attitude signal, and the servomotor is moved toward its center position.

In a similar manner, the control channels 231, 280, and 334 have their stabilizing signal generators operated.

If it be desired to alter the pitch attitude of the craft manually, the control column 142 is moved in a fore and aft direction. The operation of the control column adjusts the control valve 100 in the boost section 90 of the servomotor 94, FIGURE 2, and also through the operating connection 196 operates signal generator 193, FIGURE 3, in network 192. The signal from generator 193 causes the unbalance of network 180 whereby the autopilot section tends to assist the control provided by the boost section 98 resulting from the operation of control valve 100 in the overall positioning of the control elements of the craft to change pitch attitude. Additionally, the signal from the generator 193 opposes that derived from the pitch attitude signal generator 204. Thus the pitch attitude responsive device 208 will not prevent the manual change in craft attitude from the boost section.

If change in position of the craft about its roll axis is desired, the control column 142 is moved in a transverse plane. Such operation is transmitted through the operating connection 248 to the signal generator 247, FIGURE 4, in network 235 causing the unbalance thereof. The unbalance of this network effects operation of the amplifier 233 and the servomotor 232 which positions the devices for varying the roll attitude of the craft. Simultaneously the servomotor operates the rebalance signal generator 253 to rebalance amplifier control network 235. The operation of the control column 142 is also transmitted through operating connection 81 to the switch contactor 84, FIGURE 1. The contactor 84 is thereby disengaged from its contact 85. However, if the forward speed of the craft is under a predetermined air speed such as 40 knots, a parallel circuit will have been maintained through the switch arm 87 and contact 88 to retain the winding 72 of the directional cutout relay 71 energized. However, if the air speed of the craft is above the predetermined speed, the switch arm 87 will have been disengaged from its contact 88 thereby the energizing circuit for relay winding 72 is opened upon movement of the control column in the lateral plane. Upon deenergization of relay winding 72 the clutch energizing circuit is opened at relay arm 74 and relay contact 77 thereby the magnetic clutch winding 306, FIGURE 5, is deenergized and the heading responsive device 307 is disenergized from the signal generator 302 whereby the springs 303, 304 restore the signal generator to unoperated position. Since the operation of the control column in a lateral plane has caused the change in roll attitude of the craft, the roll attitude responsive device 260 has operated signal generator 259 to limit the magnitude of the change in roll attitude. Simultaneously the output of the signal generator 259 is supplied over conductor 325, to the control network 316, FIGURE 5. The indicated air speed device 328 similar to the device 89, FIGURE 1, in response to the speed of the aircraft above a predetermined value has operated the switch arm 327 from the unoperated position shown to the operated position whereby the roll attitude signal is supplied to the vertical axis control channel 280 of the automatic pilot. Thus a change in angular position of the craft about the vertical axis is also provided by the operation of the control column in the transverse plane when the forward air speed is above the predetermined air speed. Thus a banked turn of the craft is effected from the operation of the control column under the conditions stated. Along with the deenergization of the directional cutout relay 71 a circuit is completed from energized conductor 415, relay arm 74, relay contact 78, to an indicating device 420 for the pilot.

When desired, during forward speed of the craft, the indicated air speed device 215, FIGURE 3, may be connected to the signal generator 211 to provide control signals for maintaining the forward air speed of the craft. Similarly, the position hovering device 230 may be connected to the signal generator 226 when the craft has zero forward speed to maintain the craft in a selected geographical position in a fore and aft direction.

During the aforementioned operation of the control column 142 in a lateral direction, the operation causing a change in roll attitude of the craft, the roll attitude of the craft through the roll attitude sensing device 260 has also operated the signal generator 355 whereby the control circuit 339 has been operated causing the consequent operation of the collective pitch servo-motor 335. The servomotor is operated in a direction tending to prevent loss of altitude of the craft during the change in roll attitude.

Should there be a sudden loss in hydraulic pressure fluid to conduit 406, FIGURE 2, the pressure on the plunger section 124 decreases whereby the mechanical spring forces the contour section 124 into engagement with the portion 125 on the piston rod 116 effecting the centering of the piston 115. At this time the direct operation of the control rod 141 from the control column 142 is transmitted, through a slight loss motion connection between motor housing 95 and yoke 140 whereby the servomotor is rotated about pivot 97 to permit manual actuation of the control devices for changing the craft attitude.

If the aircraft is on automatic pilot tending to maintain the pitch attitude of the aircraft stabilized, a permanent disturbing force may be encountered tending to alter craft attitude about the pitch axis. In such instance, the craft will not regain its stabilized attitude but will attain a position in which the operation of the servomotor 94 effects operation of the control devices of the craft controlling its attitude about its pitch axis which opposes the tendency of the force on the craft. At the same time the pitch attitude responsive device will operate its signal generator 204. The amplifier control network will be balanced with the servo follow-up signal generator balancing the voltage from the pitch attitude signal generator 204. This continued operation of the servo balance potentiometer slider 131 and the consequent presence of a sustained servo follow-up signal indicates that the piston 115 of the autopilot section 99 is out of its centered position. It is desirable to have equal extents of operation of the hydraulic piston 115 on opposite sides of an initial position. It is evident that by a change in the position of the piston 115, such equal extents of operation has been altered. To compensate for this situation the signal from the follow-up signal generator is applied via conductor 422, FIGURE 2, to trim actuator amplifier 152. The amplifier 152 controls the trim actuator 150 which through gear train 149 operates the member 148. The member 148 in turn operates the cable loop 145 to adjust the position of the control column 142. The positioning of the control column moves the control valve 100 in the boost section and at the same time supplies a short term control signal through signal generator 193 in the autopilot section of the pitch attitude control. The boost section will cause operation of the control devices of the craft for positioning it about its pitch axis. Such operation will alter the atitude of the craft about the pitch axis and cause the return of the piston 115 to its center position. With the piston reaching its center position, equal movements thereof subsequently are available for the autopilot section for control of the craft about its lateral axis.

It will now be apparent that I have provided a novel manually and automatically controlled servo arrangement for operating control devices of a rotary wing aircraft. While one arrangement has been disclosed, it is to be understood that the invention is not limited to the precise embodiment thereof but is limited by the following claims.

What is claimed is:

1. In an aircraft of the type having a rotating sustaining rotor with craft pitch axis position adjusting means for varying the longitudinal attitude of the craft and craft roll axis position adjusting means for varying the lateral attitude of the craft and additionally having craft yaw axis position controlling means: in combination a servomotor for positioning said pitch axis position adjusting means; a servomotor for positioning said roll axis position adjusting means; and a servomotor for operating said yaw axis controlling means; a pilot's control lever; means responsive to operation of the lever in the fore and aft direction to effect operation of the pitch axis servomotor for altering the forward speed of the craft; means responsive to lateral movements of the control lever for controlling said roll axis servomotor; further means for controlling said roll axis servomotor responsive to the roll attitude of the craft; and means responsive to airspeeds above a selected forward airspeed of the craft for controlling said yaw control servomotor from said roll attitude responsive means.

2. Control apparatus for an aircraft having attitude control means for positioning a craft about an axis thereof, said apparatus comprising: a differential servomotor for positioning said attitude control means, said differential servomotor comprising a manually controlled power boost section and an autopilot section; a balanceable network for controlling operation of the autopilot section, said balanceable network comprising attitude responsive means and follow-up means positioned by the autopilot section; pilot stick operating means for controlling the boost section; and recentering means for the autopilot section comprising means responsive to continued operation of the follow-up means for repositioning the pilot stick to cause operation of the boost section whereby the resultant change in attitude therefrom causes said attitude means to effect opposite operation of said autopilot section effects a recentering of the autopilot section to provide subsequent equal control in opposed directions from said autopilot section.

3. In apparatus for controlling an aircraft having attitude control means, in combination: differential means for positioning the attitude control means; manually operable means for positioning one input to the differential means, craft attitude stabilizing means for controlling another input of the differential means; a balanceable network for controlling the stabilizing means including craft attitude responsive means and follow-up means; spring means for returning the manually operable means to zero force manual position; and motor means connected to the follow-up means and to the spring return means for repositioning the manually operable means upon continued displacement of the follow-up means from its normal position to effect operation of the differential means in one direction to change craft attitude so that consequent opposed operation of said differential means by said attitude stabilizing means returns said another input to such a position that it can apply equal magnitudes of control in either direction to said differential means.

4. Control apparatus for an aircraft having attitude control means, said apparatus comprising: differential means operatively connected to said attitude control means; a manually operable controller connected to one input of the differential means; a pair of limit switches alternatively operated in dependence upon extensive movements of the manual controller in opposite directions; a balanceable network for controlling another input to the differential means and selectively connected therewith; attitude responsive means for unbalancing said balanceable means and follow-up means driven by the differential means; a second pair of limit switches alternatively operated on extensive movements in opposite directions of the other input of the differential means; and further means responsive to simultaneous displacement of the manual controller in one extreme position to open one limit switch in the opposite positioning of the other input in the opposite extreme position to open a limit switch for disconnecting said balanceable means from said second differential means input.

5. Control apparatus for maintaining a condition, said apparatus comprising: motor means for controlling said condition; a balanceable parallel summing network selectively coupled to said motor means, said network comprising a plurality of direct voltage signal generators one signal generator including a phase shifting network; means responsive to a change in said condition for operating said one signal generator; follow-up means positioned by said motor means for operating a second signal generator; a source of direct voltage for said signal generators; and means responsive to a predetermined small loss in voltage from a maximum voltage by said source for decoupling said balanceable network from said motor means.

6. In apparatus for controlling a condition and having a device operable to change said condition, in combination: hydraulic motor means, having a spring biased control valve, for positioning said device, operating means for said valve; unidirectional voltage responsive means selectively coupled for operation to said operating means of said valve of said motor means; a signal generator providing voltage signals of opposite polarities in accordance with its operation from a null position to said voltage responsive means; energizing means for said signal generator comprising means for rectifying an alternating voltage; and means responsive to a small predetermined drop in energizing voltage to said signal generator for decoupling said voltage responsive means from said operating means for said valve of said motor means.

7. In control apparatus for aircraft having a device for controlling craft attitude, in combination: fluid responsive motor means for operating said device; a balanceable network selectively coupled to said motor means for variably controlling the flow rate to said motor means for effecting operation thereof on unbalance of said network; selective on-off means for connecting a source of fluid pressure to said motor and coupling said balanceable network to said motor means; and means responsive to fluid pressure to said motor rendered ineffective to center said fluid motor with the selective means in the on position but effective to center said fluid motor with the selective means in the off position.

8. In apparatus for controlling an aircraft having a craft attitude changing device, in combination: a pivotal axis; a pivoted arm rotatable about said axis and connected to said device; a differential fluid servomotor for positioning said arm comprising a servomotor body member pivoted on said axis with said arm, a manually positionable valve on one side of said axis, a movable piston in said body member controlled by said manually operable valve, said axis connecting said body member to a frame member, a positionable valve on the opposite side of said axis, a second reciprocable piston controlled by said second valve, a link member having one end connected to the second piston and the remaining end to said arm for actuation thereof upon rotation of said body member; means for supplying fluid pressure to said differential servomotor; and means for centering said second piston upon loss of fluid pressure to said servomotor.

9. In apparatus for controlling an aircraft having a device for changing craft angular position, in combination: a manually operable controller, and connecting means intermediate said controller and device for amplifying the power applied to said controller, said connecting means comprising an arm mounted on an axis and connected to said device, a fluid operated servomotor having a body member supported on a pivot, a control valve for said servomotor on one side of said pivot connected to said manual controller, a piston on the same side of said pivot connected at one end to a frame member and controlled by said valve, means integral with said body member, and a link means connecting said integral means to said arm the connection from said device to said arm being at a radial distance from said axis in excess of the distance of said link means connection with said arm from said axis.

10. In control apparatus for an aircraft having a device for controlling craft attitude, in combination: a fluid operated servomotor having an output member connected to said device; a balanceable voltage network having a plurality of signal generators; attitude means for operating one signal generator; follow-up means driven by said fluid motor means for positioning another signal generator; an induction motor for positioning a third signal generator; a full wave alternating voltage discriminator amplifier controlled by said balanceable network, said amplifier having two output terminals of opposite polarity connected to one winding of said induction motor, connections from the other winding of the induction motor to a source of alternating voltage, further means for connecting the output of said amplifier to said servomotor or to said induction motor winding; and monitor means responsive to drop in energizing voltage on the signal generators operating said further means for connecting the induction motor to the amplifier and decoupling the servomotor therefrom.

11. In an automatic pilot for an aircraft having a sustaining rotor and apparatus for controlling the attitude of the tip path plane of the rotor, in combination: a servomotor for operating the attitude controlling means; a balanceable network for controlling the servomotor; manually operable means for unbalancing said network; follow-up means driven by said servomotor for rebalancing said network; and means responsive to the longitudinal speed of said craft for unbalancing said network, whereby operation of the manual means has an unbalancing effect on said network which is opposed by airspeed responsive means so that a selected airspeed by maintained.

12. In a flight control apparatus for a rotary wing aircraft having means for controlling the attitude of the tip path plane of the blades of the rotor, in combination: manually operable control stick means for tilting the tip path plane to provide forward movement of the craft in the direction of its longitudinal axis; a servomotor for controlling the lateral attitude of the rotor tip path plane, manually operable means for controlling said servomotor; and means jointly responsive to the forward airspeed of the craft and the operation of the manual control stick for additionally controlling the angular position of said craft about its vertical or yaw axis.

13. In a rotary wing aircraft having settable means for adjusting the attitude of the tip path plane of the rotor to provide changes in pitch attitude or roll attitude of the craft and having a device for controlling the position of the craft about its vertical axis, in combination: a motor means for operating the settable means to change the pitch attitude of the craft; a servomotor for operating the settable means for changing the roll attitude of the craft; and a servomotor for operating the device for controlling craft attitude about its vertical axis; pitch stabilizing means for operating the first servomotor, roll stabilizing means for operating the second servomotor, and heading responsive means for controlling the third servomotor; manual means cooperating with the pitch attitude responsive means to initiate forward flight of the craft; manually operable means coacting with the roll attitude means for changing the lateral attitude of the craft; and further means jointly responsive to the operation of the second manual means and a predetermined forward speed of the craft for rendering the heading responsive means ineffective and for introducing an additional control effect on the third servomotor.

14. In a rotary wing aircraft having settable means for controlling the attitude of the tip path plane of the blades of the rotor in fore and aft or lateral directions to control pitch attitude and roll attitude and having yaw attitude control means for controlling the settable means to change attitude of the craft about its vertical axis, in combination: turn control apparatus comprising means for operating the settable means in a forward direction to initiate forward flight of the craft; means for operating the attitude control means for changing craft attitude about its longitudinal axis; means jointly responsive to the forward speed of the craft and the operation of the roll attitude control means for operating said yaw attitude control means to provide coordinated turns of the craft.

15. Control apparatus for a rotary wing aircraft having settable means for altering the attitude of the tip path plane of the rotor blades, in combination: a fluid servomotor for positioning said settable means; control means selectively connected to said servo means including means for positioning a valve for controlling the application of fluid pressure to said servomotor; a balanceable network for said control means comprising a plurality of signal generators said network being operable in response to the net signal from said generators; attitude responsive means for operating one signal generator, follow-up means driven by the servomotor for positioning another signal generator; and means responsive to the speed of the craft for positioning a third signal generator; a source of power for energizing said signal generating means; and means responsive to a drop in voltage from a predetermined value from said supply source for disconnecting said control means from said valve.

16. Control apparatus for a rotary wing aircraft having attitude control means for changing the position of the tip path plane of the blades of the rotor with respect to the pitch and roll axes of the craft and including collective pitch change means for controlling altitude and means for controlling the attitude of the craft about its vertical axis, in combination: first motor means for operating the attitude control means about the pitch axis, second motor means for operating the attitude control means about the roll axis; third motor means for operating the collective pitch setting means; and fourth motor means for positioning the device for controlling heading of the craft about the vertical axis; manually operable means for operating the first and second motor means to initiate forward travel of the craft and change in roll attitude of the craft; speed responsive means for applying to said heading control or fourth motor means on operation of the control stick for adjusting roll attitude a signal in accordance with roll attitude; and means responsive to the roll attitude of the craft for operating the third motor means or collective pitch setting means to maintain altitude of the craft in a banked turn.

17. Control apparatus for an aircraft having a control surface for altering craft attitude about an axis thereof, in combination: a fluid servomotor adapted to position said surface, said fluid motor being of the reciprocating type having a power piston output; an autopilot control means connectable with said servomotor; an on-off control valve for supplying fluid pressure to said servomotor; additional means, rendered ineffective by said pressure, for centering the power piston of said servomotor; and means effective on disconnection of the autopilot control means from the servomotor for operating the control valve to reduce the pressure to the servomotor and additional means whereby said servomotor power piston is adjusted to center position.

18. An apparatus for controlling the flight of an aircraft having a control surface for controlling craft attitude about an axis thereof, in combination: a differential fluid operated servomotor having a body member pivoted to said craft and having a reciprocating piston on one side of said pivot connected to the craft and a reciprocating piston on the opposite side of said pivot connected to the control surface; a control valve for applying fluid pressure to the opposite ends of the first piston, a second control valve for applying fluid pressure to the opposite side of the second piston; manually operable means for positioning the first control valve; an autopilot control means, selective means for connecting the autopilot control means to the second control valve; a craft condition responsive device and follow-up device operated by the second servomotor for controlling said autopilot control means; means effective on operation of the selective means for disconnecting the autopilot control means from the second control valve and controlled by said autopilot control means for maintaining said autopilot control means in a null condition; and further means effective on displacement of the first piston relative to the body member a predetermined amount of coincident displacement of the second piston from its normal position a predetermined amount in which the two displacements have opposing effects on said control surface, for operating the selective connecting means for disconnecting the autopilot control means from the second control valve.

19. Control apparatus for an aircraft having a control surface for controlling craft attitude, said apparatus comprising: a differential fluid operated servomotor of the plural piston type for positioning said control surface; a manually operable control valve for controlling one piston of said motor to drive said control surface; a second control valve for controlling a second piston for operating the surface from said servomotor; a balanceable automatic pilot control means having a master control voltage generator, a follow-up voltage generator, and a synchronizing voltage generator connected in summing relation for controlling the balance of the control means; means for connecting the autopilot control means to the second control valve; and means effective upon drop in supply voltage to the voltage generators in said autopilot control means for centering the second piston of said servomotor and electrically balancing the autopilot control means.

20. Control apparatus for a rotary wing craft having settable means for adjusting the tip path plane of the sustaining rotor for the craft and having a control device for controlling craft yaw, in combination: bank attitude stabilizing means and pitch attitude stabilizing means for operating the settable means for maintaining level flight; directional responsive means for operating the control device to maintain heading; manually operable means for altering the attitude of the craft which is maintained by the control of said bank and pitch attitude stabilizers; and means for transferring control of said control device from said heading responsive means to said manual means when the manually altered change in pitch attitude of the craft causes the craft to attain a predetermined forward airspeed.

21. In an automatic pilot for a dirigible craft having operable surface means for altering craft attitude about one of its axes, in combination: differential means for actuating said operable means; manually operable means for actuating said differential means; motor means for operating said differential means; attitude responsive means for controlling said motor means; and a limit switch operable by said manual means in one extreme position thereof and a further limit switch operable by said motor means upon opposite extreme position thereof from said manual means for jointly rendering said differential means ineffective on said operable means.

22. In an automatic pilot for a dirigible craft having a control surface for controlling craft attitude about an axis thereof, in combination: differential means for positioning said control surface including a fluid servomotor having a first section having a manually positionable control valve and a second servo section having an autopilot positioned control valve; a control column for positioning said manually adjustable control valve; attitude responsive means for positioning the autopilot control valve; limit switches operable by said control column upon movement thereof a predetermined distance; limit switches operated by said autopilot section upon operation thereof a predetermined distance; and further means controlled by a control column operated limit switch upon movement of the control column in one extreme position and a limit switch operated by the autopilot section upon movement thereof in an opposite extreme position for rendering said both servomotors ineffective for operating said control surface.

23. In a system for positioning the control surface of an aircraft, a manual controller, a linkage interconnecting said controller and surface, reversibly operating driving means for positioning a portion of said linkage to position said surface without displacing the remaining portion of said linkage and manual controller, a second reversibly operating driving means for positioning said entire linkage and manual controller, and means interconnecting said first driving means and second driving means for energizing said second driving means to position said entire linkage upon long term displacements of said portion of said linkage.

24. In a system for reversibly deflecting a movable control surface of a dirigible craft, a manual controller, a linkage interconnecting said controller and control surface, reversibly operating means for lengthening and shortening a portion of said linkage and thereby moving another portion of said linkage to position said member without displacing said lengthened and shortened portion of said linkage and manual controller, second operating means for reversibly positioning said entire linkage and manual controller, and means interconnecting said reversibly operating means and said second operating means for selectively energizing said second operating means to reversibly position said member in response to a sustained expansion and contraction of said linkage.

25. In a flight control system for aircraft capable of sustained flight at substantially zero airspeed including at least two signal responsive means for providing outputs respectively indicative of required changes in craft attitude about at least two of its primary axes to cause said craft to approach and maintain a desired craft attitude about one of said axes, said craft attitudes about said two axes being independent of each other at zero airspeeds but dependent on each other at airspeeds greater than zero, comprising means for supplying an error signal corresponding to the difference between the existing craft attitude about said one axis and the desired craft attitude thereabout, means connected to receive said error signal for supplying control signals to said two signal responsive means whereby to respectively control the outputs thereof in accordance with said error signal, and airspeed responsive means coupled with said last-mentioned means for varying the relative magnitudes of said control signals supplied to said signal responsive means in accordance with craft airspeed.

26. A navigation system for aircraft for enabling the craft to be caused to approach and thereafter maintain a selected heading comprising means for supplying a signal corresponding to the error between the present heading of said craft and said selected heading, means for supplying a signal corresponding to the roll angle of said aircraft, means for combining said signals for supplying an output corresponding to the algebraic sum thereof, and means responsive to the airspeed of said craft for varying the magnitude of one of said signals supplied to said combining means.

27. In an aircraft having a control surface and a means for positioning said control surface in response to manual positioning of a member by a manually operable controller, automatic pilot means comprising means continuously connected to said member for additionally positioning said member, said automatic pilot means including a signal responsive means for controlling said member position in accordance with the deviation of the aircraft about a control axis thereof, means adapted to nullify said signal responsive means, and switching means responsive to a force applied thereto for activating said nullifying means, whereby said craft is selectively controlled by said autopilot or said manual controller upon the application and removal of forces to said switching means.

28. Means for integrating manual positioning of a movable surface with automatic positioning of such surface, said means including a linkage continuously coupled to said surface, a manual controller directly and continuously coupled to position said linkage, a signal responsive means continuously coupled to said linkage for varying the position of said movable surface, a signal generating means for energizing said signal responsive means, means responsive to said signal generating means and adapted to nullify the signal generated thereby, and switching means responsive to a manual force applied thereto for actuating said nullifying means whereby prior to the application of said manual force said surface position is controlled by said signal generating means and upon the application of said force said surface position is independent of said generating means.

29. In a device for selectively positioning a movable member by either a manual controller or by automatically operating means, a linkage operatively and continuously interconnecting said manual controller and member for positioning said member with movement of the controller, a signal responsive positioning means associated with a portion of said linkage for positioning said member independently of movement of said manual controller, a signal generating means energizing said signal responsive positioning means, means responsive to said signal generating means and adapted to nullify the signal generated thereby, and switching means responsive to a manually applied force exerted thereon for actuating said nullifying means.

30. In a device for selectively positioning a movable member by either a manual controller or by automatically operating means, a linkage operatively and continuously interconnecting said manual controller and member for positioning said member with movement of the controller, a signal responsive positioning means associated with a portion of said linkage for positioning said member independently of movement of said manual controller, a first signal generating means energizing said signal responsive positioning means, a second signal generating means energizing said signal responsive positioning means, means responsive to said first signal generating means and adapted to nullify the signal generated thereby, and switching means responsive to a manually applied force exerted thereon for actuating said nullifying means.

31. In a craft having a control surface, a movable member operatively connected to said control surface to enable positioning of said control surface, a manual controller continuously connected to said member to permit movement of said member with manual movement of said controller, a signal responsive actuator continuously connected to said member to permit movement of said member in response to signals received thereby, a signal generating means having an output for energizing said actuator, means adapted to continuously nullify the output of said signal generating means, and a switching means responsive to the application of a manually applied force thereon for actuating said nullifying means.

32. In a craft having a control surface, a movable member operatively connected to said control surface to enable positioning of said control surface, a manual controller continuously connected to said member to permit movement of said member with manual movement of said controller, a signal responsive actuator continuously connected to said member to permit movement of said member in response to signals received thereby, a first signal generating means having an output energizing said actuator, a second signal generating means having an output energizing said actuator, means responsive to said first signal generating means and adapted to continuously nullify the output of said first signal generating means, and a switching means responsive to the application of a manually applied force thereon for actuating said nullifying means.

33. In a device of claim 32, said member being comprised of a variable length linkage means, and said manually operated controller adapted to position said linkage, and said signal responsive actuator adapted to vary the length of said linkage to position said control surface without positioning said manual controller.

34. A control system for a craft including in combination a manually movable member, centering means operatively associated with the member, means for variably positioning the centering means, a servomotor, means responsive to movement of the member and to the servomotor for controlling craft motion, means for providing a signal as a function of the absolute position of the member irrespective of the position of the centering means, and means responsive to the signal for controlling the servomotor.

35. A control system for a craft including in combination a manually movable member, centering means operatively associated with the member, means for providing a signal as a function of the absolute position of the member irrespective of the position of the centering means, control means responsive to the signal, means responsive to the control means and to movement of the member for governing craft motion, and means responsive to the control means for variable positioning the centering means.

36. An electrically operated hydraulic positioning servo comprising a pilot valve, a control circuit having an electrical power supply and including solenoid means connected to said pilot valve for movement thereof responsive to positioning signals supplied said circuit, a hydraulic positioning motor including a piston and cylinder connected for operation in response to movement of said pilot valve, spring actuated hydraulically restrained mechanical centering means connected to center said piston with respect to said cylinder upon loss of hydraulic pressure, and solenoid actuated valve means controlled by said electrical power supply and operative upon failure thereof to cut off hydraulic pressure to said mechanical centering means for rendering said centering means effective.

37. An electrically operated hydraulic positioning servo comprising a solenoid positioned pilot valve, electric signal generating apparatus connected to the solenoids of said pilot valve, a hydraulic positioning motor including a piston and cylinder connected for operation in response to movement of said pilot valve, a device connected to center said piston with respect to said cylinder upon loss of hydraulic pressure, and a solenoid-operated valve controlled from a source common to said signal apparatus connected to interrupt the supply of hydraulic pressure fluid to said device for rendering said device effective upon loss of electrical power from said common energy source.

38. The apparatus of claim 37 wherein the solenoid operated valve is controlled through a circuit including a conducting path that is opened upon loss of power to the electrical signal generating apparatus.

39. An electrically operated hydraulic positioning servo comprising a pilot valve, a control circuit having an electrical power supply and including electrically operated means connected to said pilot valve for movement thereof responsive to positioning signals supplied said circuit, a hydraulic positioning motor including a piston and cylinder connected for operation in response to movement of said pilot valve, spring actuated hydraulically restrained mechanical centering means connected to center said piston with respect to said cylinder upon loss of hydraulic pressure, and electrically actuated valve means controlled by said electrical power supply and operative upon failure thereof to cut off hydraulic pressure to said mechanical centering means for rendering said centering means effective.

References Cited
UNITED STATES PATENTS

| | | | |
|---|---|---|---|
| 2,705,940 | 4/1955 | Edwards | 244—78 |
| 2,853,255 | 9/1958 | Rasmussen et al. | 244—78 |

FERGUS S. MIDDLETON, *Primary Examiner.*